United States Patent [19]

Thompson, III et al.

[11] Patent Number: 4,469,639
[45] Date of Patent: Sep. 4, 1984

[54] PREPARATION OF ORGANICALLY MODIFIED SMECTITES BY TREATMENT WITH METHYL BENZYL DIALKYL AMMONIUM HALIDE

[75] Inventors: Thomas D. Thompson, III, Bucks County, Pa.; Thomas F. Walsh, Morris County; Frank J. Botta, Union County, both of N.J.

[73] Assignee: Georgia Kaolin Company, Inc., Union, N.J.

[21] Appl. No.: 372,498

[22] Filed: Apr. 28, 1982

[51] Int. Cl.$^3$ ................................................ C07F 5/06
[52] U.S. Cl. ................................................. 260/448 C
[58] Field of Search .................................... 260/448 C

[56] References Cited

U.S. PATENT DOCUMENTS

| 2,531,427 | 11/1950 | Hauser | 260/448 C |
| 2,859,234 | 11/1958 | Clem | 260/448 C |
| 2,966,506 | 12/1960 | Jordan | 260/448 C |
| 4,105,578 | 8/1978 | Finlayson et al. | 260/448 C X |
| 4,208,218 | 6/1980 | Finlayson et al. | 260/448 C X |
| 4,287,086 | 9/1981 | Finlayson et al. | 260/448 C X |
| 4,402,881 | 9/1983 | Alther | 260/448 C |
| 4,412,018 | 10/1983 | Finlayson et al. | 260/448 C X |

FOREIGN PATENT DOCUMENTS 2847147  5/1979  Fed. Rep. of Germany.

Primary Examiner—Helen M. S. Sneed
Attorney, Agent, or Firm—William W. Habelt

[57] ABSTRACT

An organically modified smectite is produced by reacting unfractionated pulverized bentonite with an aqueous dispersion or solution of a methyl benzyl dialkyl ammonium halide salt via cation exchange. The product organoclay is equivalent in quality to a "wet" processed organoclay, and has particular utility as an ingredient in forming invert emulsion drilling mud for enhancing the rheological properties of the mud. An invert emulsion drilling mud derived from an organoclay produced by the method of the present invention will have a viscosity of at least seventy (70) centipoise at 26 C and a 10-second gel strength at 26 C of at least thirty (30) pounds per 100 square feet.

23 Claims, No Drawings

PREPARATION OF ORGANICALLY MODIFIED SMECTITES BY TREATMENT WITH METHYL BENZYL DIALKYL AMMONIUM HALIDE

BACKGROUND OF THE INVENTION

The present invention relates generally to the preparation of organoclays via ion exchange with a quaternary ammonium halide. More specifically, the present invention relates to preparing organically modified smectites having improved rheological properties for use in invert emulsion drilling fluids, greases, paints and the like by a dry process in which pulverized smectite is added to a solution of methyl benzyl dialkyl ammonium halide salt to produce via ion exchange the improved organoclay.

Smectites are clay minerals, including montmorillonite, saponite, beidellite, and hectorite, which are characterized by their swelling properties and high cation-exchange capacities. Bentonite, a rock term in which the main mineral is smectite, is formed as a result of the alteration of volcanic ash. Smectites, and bentonites, whose exchangeable cations are mainly sodium, are respectively known to those skilled in the art as sodium smectite and sodium bentonite, and those whose exchangeable cations are mainly calcium and/or magnesium are respectively known to those skilled in the art as alkaline earth smectites and alkaline earth bentonite. The cation exchange capacities of pure smectites generally range between 75 milliequivalents per 100 grams clay to 110 milliequivalents per 100 grams clay.

It is well known to those skilled in the art that the rheological properties of drilling muds, greases, paints and the like can be improved by the incorporation of organically modified clays. Typically, organoclays for these purposes are formed by the so-called "wet" process, as, heretofore, the rheological properties of organoclays produced via the so-called "dry" process have been significantly poorer than those exhibited by "wet" processed organoclays.

In the typical "wet" process for preparing organoclays, the crude clay is water fractionated in a low solids slurry, typically in the range of 6 to 8 percent, to remove all particles greater than about 2 microns. The greater than 2 microns fraction is discarded, while the remaining fraction, which consists essentially of only the montmorillonite fraction of the crude clay, is then reacted with an amine, such as a quaternary ammonium halide salt, to produce an organoclay having the desired rheological properties. The reacted mixture is then filtered to yield a filter cake which comprises an organically modified montmorillonite.

For example, a "wet" processed smectite when reacted with a dimethyl dialkyl ammonium halide, such as dimethyl dihydrogenated tallow ammonium chloride, yields an organoclay which performs well in paints, drilling muds and greases. On the other hand, a "wet" processed smectite when reacted with a dimethyl benzyl alkyl ammonium halide, such as dimethyl benzyl hydrogenated tallow ammonium chloride, yields an organoclay which functions poorly in paints drilling muds and greases, but performs well as a thickener for unsaturated polymers. In the so called "dry" process for preparing organoclays, the step of pretreating the crude clay via water fractionation to isolate the montmorillonite fraction of the crude clay is forsaken. That is, in "dry" process preparation, the crude clay per se is reacted with the quaternary ammonium halide salt rather than merely the montmorillonite fraction of the clay as in "wet" process preparation of the organoclay. Thus, in "dry" process preparation the expense and time consumption associated with water fractionation is avoided and the whole clay, not just the montmorillonite portion thereof, is utilized. Unfortunately, when either of the above-mentioned quaternary ammonium halides was reacted with a bentonite via the so-called "dry" process, the rheological performance of the resulting organoclay was significantly poorer than that of its "wet" process counterpart.

SUMMARY OF THE INVENTION

Therefore, it is an object of the present invention to provide an improved "dry" process of preparing an organoclay wherein dried unfractionated pulverized smectite is reacted with a quaternary ammonium halide to yield a product organoclay having improved rheological properties.

According to the present invention, an organically modified smectite is produced by reacting unfractionated pulverized bentonite, preferably a sodium bentonite with an aqueous dispersion or solution of a methyl benzyl dialkyl ammonium halide salt via cation exchange. The product organoclay is equivalent in quality to a "wet" processed organoclay, and has particular utility as an ingredient in forming invert emulsion drilling mud for enhancing the rheological properties of the mud. An invert emulsion drilling mud derived from an organoclay produced by the method of the present invention will have a viscosity of at least seventy (70) centipoise at 26 C. and a 10-second gel strength at 26 C. of at least 30 (30) pounds per 100 square feet.

In general, a wide range of quaternary ammonium halides are satisfactory for use in the method of the present invention, provided they are a member of the class of quaternary ammonium halides of the general formula

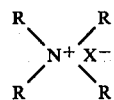

in which one R is a methyl group, one R is a benzyl group, two R's are alkyl groups and X is a halogen. Preferably, the two alkyl groups are both long chain hydrocarbons having at least sixteen carbons such as hydrogenated tallow.

As the cation exchange capabilities of smectites generally range between 75 to 110 milliequivalents per 100 grams of smectite, the amount of quaternary ammonium halide required to modify the bentonite may vary. In general, quaternary ammonium halide treatment levels of 55 to 70 milliequivalents were optimum resulting in product organoclays having optimum rheological properties. Further in accordance with the present invention, undried pulverized smectite crude may be pretreated with hydroquinone in the presence of air so as to oxidize structural iron in the smectite from the ferrous state to the ferric state. The oxidized smectite is then reacted with the dispersion or solution of a methyl benzyl dialkyl ammonium halide to form the organoclay via cation exchange.

DESCRIPTION OF THE PREFERRED EMBODIMENTS

The present invention can perhaps be better understood with reference to the following examples and the discussion thereof presented hereinafter. These examples are to be regarded as illustrative, but not in any way limiting, of the present invention.

EXAMPLE 1

A 60% solids dispersion of smectite (Mowery bentonite) in water was prepared by adding 200 milliliters of water to 300 grams of dry smectite while mixing on a Hobart mixer at moderate shear for 10 minutes. Then 195.6 grams of a 60% solids aqueous dispersion of methyl benzyl dihydrogenated tallow ammonium chloride salt was added slowly. The operation of the mixer was continued for 30 minutes. At the end of the 30 minute period, the operation of the mixer was discontinued and the resultant granular product then dried and pulverized.

EXAMPLE 2

A 60% solids dispersion of smectite (Mowery bentonite) in water was prepared by adding 200 milliliters of water to 300 grams of dry smectite while mixing on a Hobart mixer at moderate shear for 10 minutes. Then 169 grams of a 60% solids aqueous dispersion of dimethyl dihydrogenated tallow ammonium chloride salt was added slowly. The operation of the mixer was continued for 30 minutes. At the end of the 30 minute period, the operation of the mixer was discontinued and the resultant granular product then dried and pulverized.

EXAMPLE 3

A 60% solids dispersion of smectite (Mowery bentonite) in water was prepared by adding 200 milliliters of water to 300 grams of dry smectite while mixing on a Hobart mixer at moderate shear for 10 minutes. Then 141 grams of a 60% solids aqueous dispersion of dimethyl benzyl long chain (18 to 22 carbons) alkyl ammonium chloride salt was added slowly. The operation of the mixer was continued for 30 minutes. At the end of the 30 minute period, the operation of the mixer was discontinued and the resultant granular product then dried and pulverized.

EXAMPLE 4

A 60% solids dispersion of smectite (Mowery bentonite) in water was prepared by adding 200 milliliters of water to 300 grams of dry smectite while mixing on a Hobart mixer at moderate shear for 10 minutes. Then 129.3 grams of a 60% solids aqueous dispersion of dimethyl benzyl hydrogenated tallow ammonium chloride salt was added slowly. The operation of the mixer was continued for 30 minutes. At the end of the 30 minute period, the operation of the mixer was discontinued and the resultant granular product then dried and pulverized.

EXAMPLE 5

A 60% solids dispersion of smectite (Mowery bentonite) in water was prepared by adding 200 milliliters of water to 300 grams of dry smectite while mixing on a Read mixer at high shear for 10 minutes. Then 195.6 grams of a 60% solids aqueous dispersion of methyl benzyl dihydrogenated tallow ammonium chloride salt was added slowly. The operation of the mixer was continued for 30 minutes. At the end of the 30 minute period, the operation of the mixer was discontinued and the resultant granular product then dried and pulverized.

EXAMPLE 6

A 60% solids solution of smectite (Mowery bentonite) in water was prepared by adding 0.6 grams of hydroquinone to 200 milliliters of water. The water and hydroquinone solution was then added to 300 grams of dry smectite while mixing on a Hobart mixer at moderate shear for 10 minutes. Then 195.6 grams of a 60% solids aqueous dispersion of methyl benzyl dihydrogenated tallow ammonium chloride salt was added slowly. The operation of the mixer was continued for 30 minutes. At the end of the 30 minute period, the operation of the mixer was discontinued and the resultant granular product then dired and pulverized.

EXAMPLE 7

A 60% solids solution of smectite (Mowery bentonite) in water was prepared by adding 0.6 grams of hydroquinone to 200 milliliters of water. The water and hydroquinone solution was then added to 300 grams of dry smectite while mixing on a Read mixer at high shear for 10 minutes. Then 195.6 grams of a 60% solid aqueous dispersion of methyl benzyl dihydrogenated tallow ammonium chloride salt was added slowly. The operation of the mixer was continued for 30 minutes. At the end of the 30 minute period, the operation of the mixer was discontinued and the resultant granular product then dried and pulverized.

EXAMPLE 8

A 5% solids dispersion of smectite (Mowery bentonite) in water was prepared by adding 200 milliliters of water to 25 grams of dry smectite while mixing on a Hobart mixer at moderate shear for 10 minutes. Then, a 30% solid aqueous dispersion of methyl benzyl dihydrogenated tallow ammonium chloride salt was added slowly to the 5% solids smectite dispersion. The operation of the mixer was continued for 30 minutes. At the end of the 30 minute period, the operation of the mixer was discontinued and the resultant slurry filtered whereby the solids were separated from the aqueous phase and recovered as a filter cake which comprises the product organoclay. The filter cake was then dried and pulverized.

EXAMPLE 9

A surfactant, in particular a 2% solution of Triton X-100, was added to a 30% solids aqueous dispersion of methyl benzyl dihydrogenated tallow ammonium chloride salt to solubilize the salt. After the salt was completely solubilized, the methyl benzyl dihydrogenated tallow ammonium chloride solution was slowly added to undried (16% moisture) bentonite crude. After all the solution was added, the mixture was subjected to mixing at moderate shear for a period of 30 minutes. At the end of the 30 minute period, the operation of the mixer was discontinued and the resulting granular product then dried and pulverized.

EXAMPLE 10

A 20% solution of isopropyl alcohol was added to a 30% solids aqueous dispersion of methyl benzyl dihydrogenated tallow ammonium chloride salt to solubilize the salt. After the salt was completely solubilized, the methyl benzyl dihydrogenated tallow ammonium chloride solution was slowly added to undried (16% moisture) bentonite crude. After all the solution was added, the mixture was subjected to mixing at moderate shear for a period of 30 minutes. At the end of the 30-minute period, the operation of the mixer was discontinued and the resultant granular product then dried and pulverized.

EXAMPLE 11

An undried (16% moisture) bentonite crude was slowly added to a 30% solids aqueous dispersion of methyl benzyl dihydrogenated tallow ammonium chloride salt. After all of the bentonite was added, the mixture was subjected to mixing at moderate shear for a period of 30 minutes. At the end of the 30 minute period, the operation of the mixer was discontinued and the resultant granular product then dried and pulverized.

EXAMPLE 12

A surfactant, in particular a 2% solution of Triton X-100, was added to a 30% solids aqueous dispersion of methyl benzyl dihydrogenated tallow ammonium chloride salt to solubilize the salt. After the salt was completely solubilized, undried (16% moisture) bentonite crude was slowly added to the solution. After all of the bentonite was added, the mixture was subjected to mixing at moderate shear for a period of 30 minutes. At the end of the 30 minute period, the operation of the mixer was discontinued and the resultant granular product then dried and pulverized.

EXAMPLE 13

391.2 grams of a 30% solids aqueous dispersion of methyl benzyl dihydrogenated tallow ammonium chloride salt was poured into the bowl of a Hobart mixer and heated to 60 C. To this heated quaternary ammonium chloride salt, 25 milliliters of a 20% solution of isopropyl alcohol was added to solubilize the quaternary ammonium chloride salt. After the salt was completely solubilized, 357 grams of undried (16% moisture) bentonite crude was slowly added. After all of the bentonite was added, the mixture was subjected to mixing at moderate shear for a period of 30 minutes. At the end of the 30 minute period, the operation of the mixer was discontinued and the resultant granular product then dried and pulverized.

In order to determine the optimum procedures for producing an improved organoclay in accordance with the present invention, each of the organoclays prepared in Examples 1 through 10 was used to prepare an invert emulsion drilling mud product. The rheological properties of the mud product of each organoclay, including apparent viscosity, plastic viscosity, yield point and gel strength, were measured and compared. This comparison resulted in the discovery of the optimum dry process of the present invention for producing an organically modified smectite by reacting unfractionated smectite crude with an aqueous dispersion or solution of a methyl benzyl dialkyl ammonium halide salt. Further, it was discovered that nature of the dialkyl groups of the quaternary ammonium halide, the intensity of shear during mixing, the oxidation state of the iron in the smectite, the order of addition with respect to the smectite and the quaternary ammonium halide, and treatment level, reach influenced the quality of the product organoclay.

In each instance, the invert emulsion drilling mud product was prepared by the following procedure. First, 15 grams of Invermul liquid (an emulsifying agent produced by NL Industries) was added to 210 milliliters of No. 2 diesel fuel and blunged on a Multimixer for one minute. Then 140 milliliters of deionized water was added to the oil mixture and the mixture blunged for an additional 10 minutes. Thence 10 grams of one of the example organoclays was added to the mixture and the mixture blunged for an additional 10 minutes to produce the mud product.

The rheological properties of the mud product of each organoclay were then measured. Shear stress readings were taken at a rotating viscometer at 300 and 600 rpm in order to determine apparent viscosity, plastic viscosity, and yield point assuming Bingham Plastic flow behavior in accordance with standard procedures well known to those skilled in the art. Gel strength was also measured by maximum needle deflection of the rotating viscometer at 3 rpm after allowing the sample to stand 10 seconds.

The rheological properties of the mud products are compared in Tables I and II. Each mud product is identified by the example number of its corresponding organoclay. That is, mud product #1 was produced in accordance with the procedure outlined hereinbefore using the organoclay produced as outlined in example 1, mud product #2 using the organoclay produced as outlined in example 2, and so on. The units on apparent viscosity and plastic viscosity are centipoise and units on yield point and gel strength are pounds per 100 square feet.

TABLE I

| Mud Product | Apparent Viscosity | Plastic Viscosity | Yield Point | Gel Strength |
|---|---|---|---|---|
| 1 | 73.5 | 23 | 83 | 35.0 |
| 2 | 57.5 | 21 | 70 | 28.0 |
| 3 | 38.0 | 28 | 19 | 6.0 |
| 4 | 36.0 | 24 | 28 | 6.0 |
| 5 | 59.5 | 22 | 70 | 29.0 |
| 6 | 79.5 | 29 | 98 | 38.5 |
| 7 | 41.0 | 23 | 32 | 19.0 |

As illustrated by comparing mud products 1 thru 4 of Table I, the nature of the quaternary ammonium halide salt used in preparing the organoclay in accordance with the dry process of the present invention does influence the rheological properties of an invert emulsion drilling mud produced therefrom. A quaternary ammonium halide salt having two long chain alkyl groups, such as methyl benzyl dihydrogenated tallow ammonium chloride (example 1) and dimethyl dihydrogenated tallow ammonium chloride (example 2) leads to a product mud having improved rheological properties over quaternary ammonium halide salts having only one long chain alkyl group, such as dimethyl benzyl hydrogenated tallow ammonium chloride (example 3 and example 4). Further, replacing one of the methyl groups of dimethyl dihydrogenated ammonium chloride (example 2) with a benzyl group to give methyl benzyl dihydrogenated tallow ammonium chloride (example 1) resulted in a significant improvement in the apparent viscosity and gel strength of the mud product.

It is well known to those skilled in the art that treating a smectite with hydroquinone and mixing with air results in the oxidation of structural iron in the smectite from the ferrous to the ferric state. As a result of this oxidation, the net negative charge on the silicate is reduced thereby allowing the layers to swell and cation exchange reactions to proceed more easily. A comparison of mud products 1 and 6 illustrates the improvement which can be obtained in rheological properties by using an organoclay produced in accordance with the dry process of the present invention wherein the smectite crude was treated with hydroquinone prior to reaction with the quaternary ammonium halide salt. Product 6 was produced from the organoclay of example 6, while product 1 was produced from the organoclay of example 1. The only difference in the procedures of example 1 and 6 was that in example 6 the smectite was pretreated with hydroquinone to oxidize the structural iron contained in the smectite.

Additionally, further tests indicated that drying the smectite crude prior to hydroquinone oxidization resulted in an organoclay which produced a mud product inferior to the mud product derived from an organoclay produced by pretreating undried smectite crude with hydroquinone. It is speculated that the inferior quality arises from reduced expansion of the silicate layers and reduced oxidation of structural iron when the smectite crude is dried prior to pretreatment with hydroquinone. Therefore, if the smectite crude is to be pretreated with hydroquinone prior to reaction with the quaternary ammonium halide, it is preferred to pretreat the undried crude.

The intensity of the shear experienced during the mixing of the smectite crude with the quaternary ammonium halide salt also affects the rheological properties of the product as illustrated by a comparison of product 5 to product 1 and product 7 to product 6. The organoclays of examples 1 and 6 were produced under conditions of mixing at moderate shear, while the organoclays of examples 5 and 7 were produced under the identical conditions as examples 1 and 6, respectively, except that mixing occurred at high shear. The use of high shear mixing resulted in a drastic decrease in the apparent viscosity and gel strength of mud products 5 and 7 as compared to mud products 1 and 6, respectively. This deterioration in product quality takes place whether or not the smectite used to produce the organoclay is pretreated with hydroquinone. Accordingly, the dry process of the present invention should always be carried out at a low or moderate shear mixing.

TABLE II

| Mud Product | Apparent Viscosity | Plastic Viscosity | Yield Point | Gel Strength |
| --- | --- | --- | --- | --- |
| 8 | 83.0 | 31 | 93 | 41.0 |
| 9 | 85.0 | 35 | 98 | 40.0 |
| 10 | 88.5 | 28 | 114 | 43.0 |
| 11 | 80.0 | 32 | 96 | 39.0 |
| 12 | 92.0 | 37 | 113 | 45.0 |
| 13 | 97.5 | 48 | 97 | 45.0 |

As illustrated in Table II, mud products, 12 and 13, derived from the organoclays of examples 12 and 13, respectively, which were produced by reacting bentonite with an aqueous solution of methyl benzyl dihydrogenated tallow ammonium chloride, exhibited higher apparent viscosities and gel strengths than mud product 11, which was derived from the organoclay of example 11 which was produced by reacting bentonite under similar conditions with an aqueous dispersion of methyl benzyl dihydrogenated ammonium chloride. Mud products 9 and 10, derived from the organoclays of examples 9 and 10, respectively, which were produced by reacting a methyl benzyl dihydrogenated tallow ammonium chloride solution with undried bentonite crude, also exhibited higher apparent viscosities than mud product 8 which was derived from the organoclay of example 8 which was produced by reacting an aqueous dispersion of methyl benzyl dihydrogenated ammonium chloride with a low solids dispersion of bentonite crude.

In examples 10 and 13, isopropyl alcohol was used to solubilize the quaternary ammonium chloride salt, while in examples 9 and 12, a surfactant was used to solubilize the quaternary ammonium chloride salt. A comparison of the corresponding mud products shows that isopropyl alcohol is the preferred solvent. Whatever the solvent, a superior mud product was obtained when made from an organoclay produced in accordance with the dry process of the present invention with the quaternary ammonium halide salt being solubilized prior to coming into contact with the smectite.

Another factor influencing the rheological properties of the mud products is the order of addition of the reactants in the process of producing the organoclays from which the mud products are derived. The organoclays of examples 12 and 13 were produced by adding undried bentonite crude directly to the methyl benzyl dihydrogenated tallow ammonium chloride. In producing the organoclays of examples 9 and 10, however, the order of addition is reversed with the methyl benzyl dihydrogenated tallow ammonium chloride being added to the undried bentonite crude.

As mud products 12 and 13 showed superior rheological properties as compared to mud products 9 and 10, it is preferred in carrying out the dry process of the present invention to add the smectite crude to the quaternary ammonium chloride. This is most likely due to the fact that when the ammonium chloride suspension is added to the clay, the mixture becomes very stiff and requires high shear mixing. As indicated previously, high shear mixing causes a deterioration in product quality; therefore, order of addition should be carried out in such a way as to minimize shear during mixing.

The level of treatment of the smectite with the quaternary ammonium halide salt also influences the rheological properties of the mud product derived from the resultant organoclay. Although good results are obtainable over a wide range of treatment levels, the optimum level of treatment ranges from 55 to 70 milliequivalents per 100 grams of smectite. The best mode presently contemplated for making an organoclay using the whole smectite crude in accordance with the present invention is as follows:

a. heating a 30% solids dispersion of methyl benzyl dihydrogenated tallow ammonium chloride salt in water to a temperature of about 60 C.;

b. adding isopropyl alcohol to said dispersion in sufficient amount so as to substantially solubilize the methyl benzyl dihydrogenated tallow ammonium chloride salt;

c. treating undried pulverized bentonite crude with hydroquinone in the presence of oxygen so as to oxidize structural iron in the bentonite crude from the ferrous to ferric state;

d. slowly adding the oxidized bentonite to the heated methyl benzyl dihydrogenated tallow ammonium chloride solution until a treatment level in the range of 60 to 65 milliequivalents per 100 grams of bentonite is attained; and e. blending the oxidized bentonite and methyl benzyl dihydrogenated tallow ammonium chloride mixture at moderate shear mixing for about 30 minutes prior to drying.

It is to be understood that the best mode for carrying out the present invention as recited hereinbefore is presented by the applicants to comply with the requirements of Title 35, paragraph 112 of the United States Code and is not intended to be regarded as in any way limiting the present invention. It will be appreciated that modifications may readily be made by those skilled in the art to the embodiments of the present invention alluded to herein. Therefore, it is intended by the appended claims to cover any such modifications which fall within the true spirit and scope of the present invention as set forth in the appended claims.

We claim:

1. A method of preparing an organically modified smectite comprising:
   (a) adding an unfractionated pulverized smectite crude directly to an aqueous dispersion of a methyl benzyl dialkyl ammonium halide salt at a treatment level in the range of 55 to 70 milliequivalents of methyl benzyl dialkyl ammonium halide per one hundred grams of smectite; and
   (b) blending the smectite crude and methyl benzyl dialkyl ammonium halide mixture at moderate shear to permit the methyl benzyl dialkyl ammonium halide and smectite to react via cation exchange.

2. A method of preparing an organically modified smectite as recited in claim 1 further comprising:
   (a) preparing an aqueous dispersion of approximately 60% solids of smectite by mixing the unfractionated pulverized smectite crude with water;
   (b) mixing the aqueous dispersion of unfractionated smectite crude directly with the aqueous dispersion of a methyl benzyl dialkyl ammonium halide salt; and
   (c) blending the smectite and methyl benzyl dialkyl ammonium halide mixture at moderate shear to permit the methyl benzyl dialkyl ammonium halide and smectite to react via cation exchange.

3. A method of preparing an organically modified smectite as recited in claims 1 or 2 wherein the smectite crude is a predominantly sodium smectite crude.

4. A method of preparing an organically modified smectite as recited in claim 3 wherein the sodium smectite crude is a bentonite crude.

5. A method of preparing an organically modified smectite as recited in claims 1 or 2 wherein each of the dialkyl radicals of the methyl benzyl dialkyl ammonium halide salt is a long chain hydrocarbon having at least sixteen carbons.

6. A method of preparing an organically modified smectite as recited in claim 5 wherein each of the dialkyl radicals of the methyl benzyl dialkyl ammonium halide salt is a hydrogenated tallow.

7. A method of preparing an organically modified smectite as recited in claim 6 wherein the halogen of the methyl benzyl dialkyl ammonium halide salt is chlorine.

8. A method of preparing an organically modified smectite as recited in claims 1 or 2 further comprising adding an organic solvent to the aqueous dispersion of a methyl benzyl dialkyl ammonium halide salt prior to reacting the smectite and methyl benzyl dialkyl ammonium halide so as to dissolve the methyl benzyl dialkyl ammonium halide salt.

9. A method of preparing an organically modified smectite as recited in claim 8 wherein the organic solvent is an alcohol.

10. A method of preparing an organically modified smectite as recited in claim 8 wherein this smectite crude is a predominantly sodium smectite crude.

11. A method of preparing an organically modified smectite as recited in claim 10 wherein the sodium smectite crude is a bentonite crude.

12. A method of preparing an organically modified smectite as recited in claim 8 wherein each of the dialkyl radicals of the methyl benzyl dialkyl ammonium halide salt is a long chain hydrocarbon having at least sixteen carbons.

13. A method of preparing an organically modified smectite as recited in claim 12 wherein each of the dialkyl radicals of the methyl benzyl dialkyl ammonium halide salt is a hydrogenated tallow.

14. A method of preparing an organically modified smectite as recited in claim 13 wherein the halogen of the methyl benzyl dialkyl ammonium halide salt is chlorine.

15. A method of preparing an organically modified smectite comprising:
   (a) preparing an aqueous dispersion of approximately 60% solids by adding a solution of hydroquinone in water to unfractionated pulverized smectite crude;
   (b) blending the smectite and hydroquinone dispersion in the presence of air so as to oxidize the structural iron in the smectite from the ferrous to the ferric state;
   (c) mixing the oxidized smectite containing dispersion with an aqueous dispersion of a methyl benzyl dialkyl ammonium halide salt at a treatment level in the range of 55 to 70 milliequivalents of methyl benzyl dialkyl ammonium halide per one hundred grams of smectite; and
   (d) blending the smectite and methyl benzyl dialkyl ammonium halide mixture at moderate shear to permit the methyl benzyl dialkyl ammonium halide and oxidized smectite to react via cation exchange.

16. A method of preparing an organically modified smectite as recited in claim 15 further comprising adding an organic solvent to the aqueous dispersion of a methyl benzyl dialkyl ammonium halide salt prior to reacting the smectite and methyl benzyl dialkyl ammonium halide so as to dissolve the methyl benzyl dialkyl ammonium halide salt.

17. A method of preparing an organically modified smectite as recited in claim 16 wherein the organic solvent is an alcohol.

18. A method of preparing an organically modified smectite as recited in claims 15, 16 or 17 wherein the smectite crude is a predominantly sodium smectite crude.

19. A method of preparing an organically modified smectite as recited in claim 18 wherein the sodium smectite crude is a bentonite crude.

20. A method of preparing an organically modified smectite as recited in claims 15, 16 or 17 wherein each of the dialkyl radicals of the methyl benzyl dialkyl ammonium halide salt is a long chain hydrocarbon having at least sixteen carbons.

21. A method of preparing an organically modified smectite as recited in claim 20 wherein each of the dialkyl radicals of the methyl benzyl dialkyl ammonium halide salt is a hydrogenated tallow.

22. A method of preparing an organically modified smectite as recited in claim 21 wherein the halogen of the methyl benzyl dialkyl ammonium halide salt is chlorine.

23. A method of preparing an organoclay comprising:
  (a) heating a 30% solids dispersion of methyl benzyl dihydrogenated tallow ammonium chloride salt in water to a temperature of about 60 C;
  (b) adding isopropyl alcohol to said dispersion in sufficient amount so as to substantially solubilize the methyl benzyl dihydrogenated tallow ammonium chloride salt;
  (c) treating undried unfractionated pulverized bentonite crude with hydroquinone in the presence of oxygen so as to oxidize structural iron in the bentonite crude from the ferrous to ferric state;
  (d) slowly adding the oxidized bentonite to the heated methyl benzyl dihydrogenated tallow ammonium chloride solution until a treatment level in the range of 60 to 65 milliequivalents per 100 grams of bentonite is attained; and
  (e) blending the oxidized bentonite and methyl benzyl dihydrogenated tallow ammonium chloride mixture at moderate shear mixing for about 30 minutes prior to drying.

* * * * *